(12) United States Patent
Popke

(10) Patent No.: US 11,214,104 B2
(45) Date of Patent: Jan. 4, 2022

(54) GEARBOX BRAKE TRAILER APPARATUS

(71) Applicant: Ryland Popke, Enumclaw, WA (US)

(72) Inventor: Ryland Popke, Enumclaw, WA (US)

(*) Notice: Subject to any disclaimer, the term of this patent is extended or adjusted under 35 U.S.C. 154(b) by 156 days.

(21) Appl. No.: 16/680,075

(22) Filed: Nov. 11, 2019

(65) Prior Publication Data

US 2021/0138856 A1 May 13, 2021

(51) Int. Cl.
*B62D 59/02* (2006.01)
*B60D 1/24* (2006.01)

(52) U.S. Cl.
CPC ........... *B60D 1/242* (2013.01); *B62D 59/02* (2013.01)

(58) Field of Classification Search
CPC ............................... B60D 1/242; B62D 59/02
USPC ........................................................ 280/400
See application file for complete search history.

(56) References Cited

U.S. PATENT DOCUMENTS

| 6,419,037 | B1 | 7/2002 | Kramer |
| 7,147,070 | B2 | 12/2006 | Leclere |
| 7,743,859 | B2 | 6/2010 | Forsyth |
| 8,820,443 | B2 | 9/2014 | Ferri |
| 9,587,692 | B2 | 3/2017 | Gutelius |
| 9,797,505 | B2 | 10/2017 | Dufford |
| 9,868,328 | B2 | 1/2018 | Kortesalmi |
| 2006/0012145 | A1* | 1/2006 | Gardner ............... B60G 7/008 280/124.128 |

* cited by examiner

*Primary Examiner* — Minnah L Seoh
*Assistant Examiner* — Felicia L. Brittman

(57) ABSTRACT

A gearbox brake trailer apparatus for safe downhill towing includes a frame having a front end, a left side, a right side, and a rear end. The front end has a trailer hookup configured to selectively engage with a trailer hitch of a truck. A trailer deck is coupled to the frame. Each of a plurality of wheel pairs has an axle rotatably coupled between the left side and the right side of the frame and a pair of tires coupled to the axle. A gearbox is coupled to the frame and has a wiring harness configured to selectively engage with an electrical control plug of the truck. A drive linkage is coupled to the gearbox and is in operational communication with the gearbox and with the axle of a front most wheel pair of the plurality of wheel pairs to brake the rotation of the front most wheel pair.

9 Claims, 5 Drawing Sheets

GEARBOX BRAKE TRAILER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trailers and more particularly pertains to a new trailer for safe downhill towing.

(2) Description of Related Art Including Information Disclosed Under 37 CFR 1.97 and 1.98

The prior art relates to trailers.

BRIEF SUMMARY OF THE INVENTION

An embodiment of the disclosure meets the needs presented above by generally comprising a frame having a front end, a left side, a right side, and a rear end. The front end has a trailer hookup configured to selectively engage a trailer hitch of a truck. A trailer deck is coupled to the frame and covers the left side, the right side, and the rear end of the frame. A plurality of wheel pairs is coupled to the frame. Each of the wheel pairs has an axle rotatably coupled between the left side and the right side of the frame and a pair of tires coupled to the axle. A gearbox is coupled to the frame and has a wiring harness configured to selectively engage with an electrical control plug of the truck. A drive linkage is coupled to the gearbox and is in operational communication with the gearbox and with the axle of a front most wheel pair of the plurality of wheel pairs to brake the rotation of the front most wheel pair.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
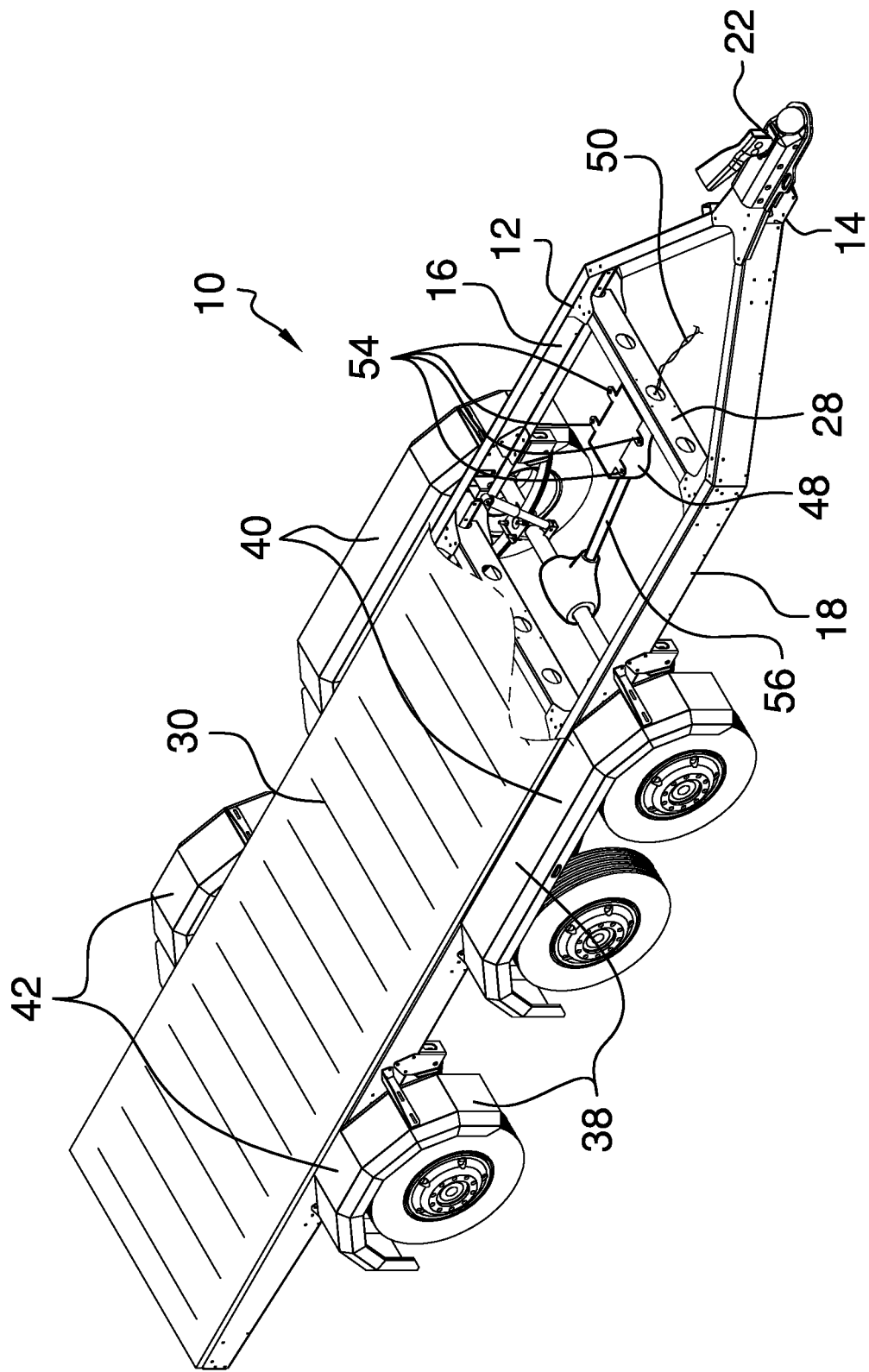
FIG. 1 is an isometric view of a gearbox brake trailer apparatus according to an embodiment of the disclosure.
Figure 2:
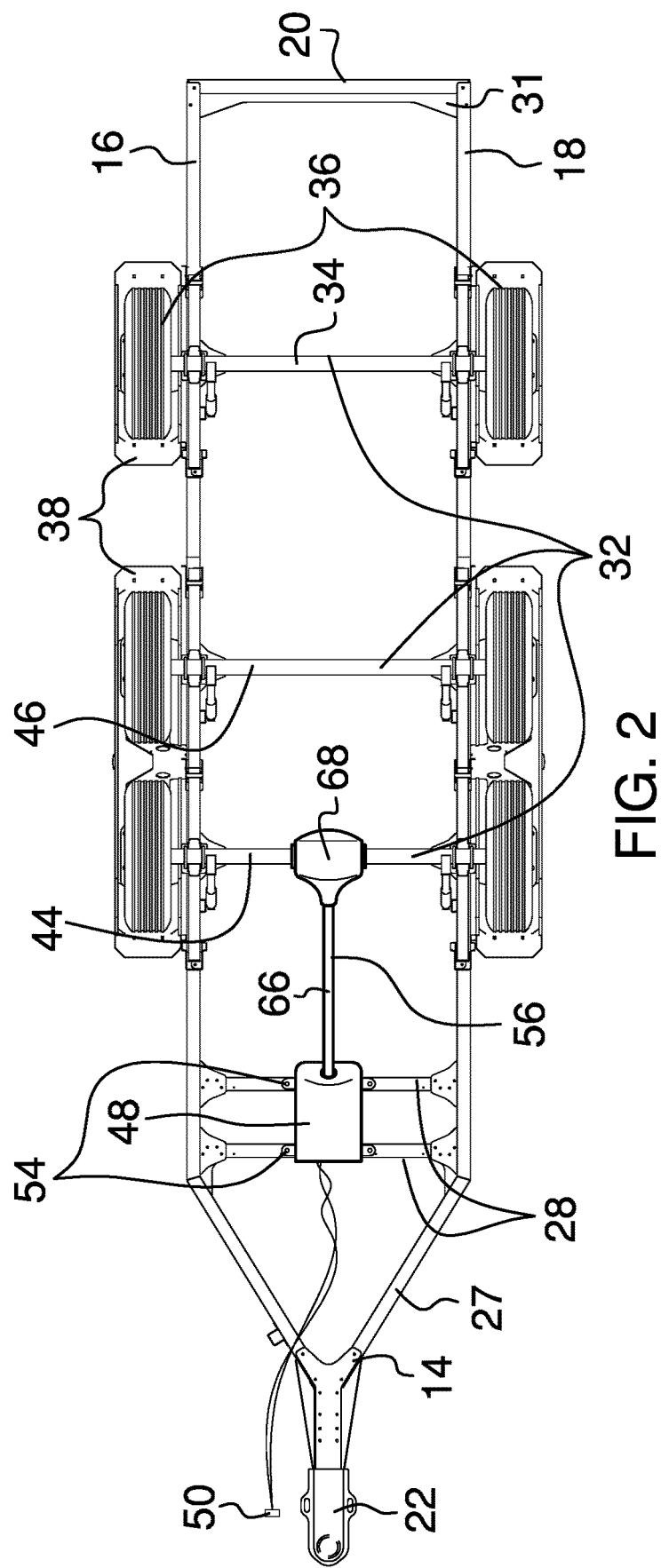
FIG. 2 is a bottom plan view of an embodiment of the disclosure.
Figure 3:
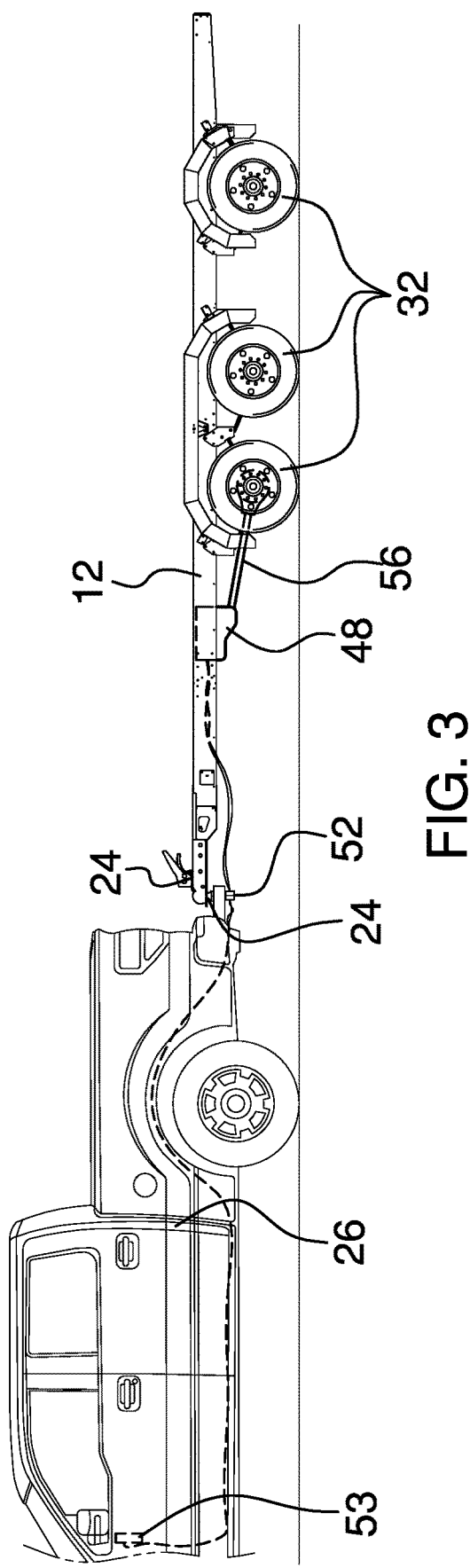
FIG. 3 is a side elevation view of an embodiment of the disclosure.
Figure 4:
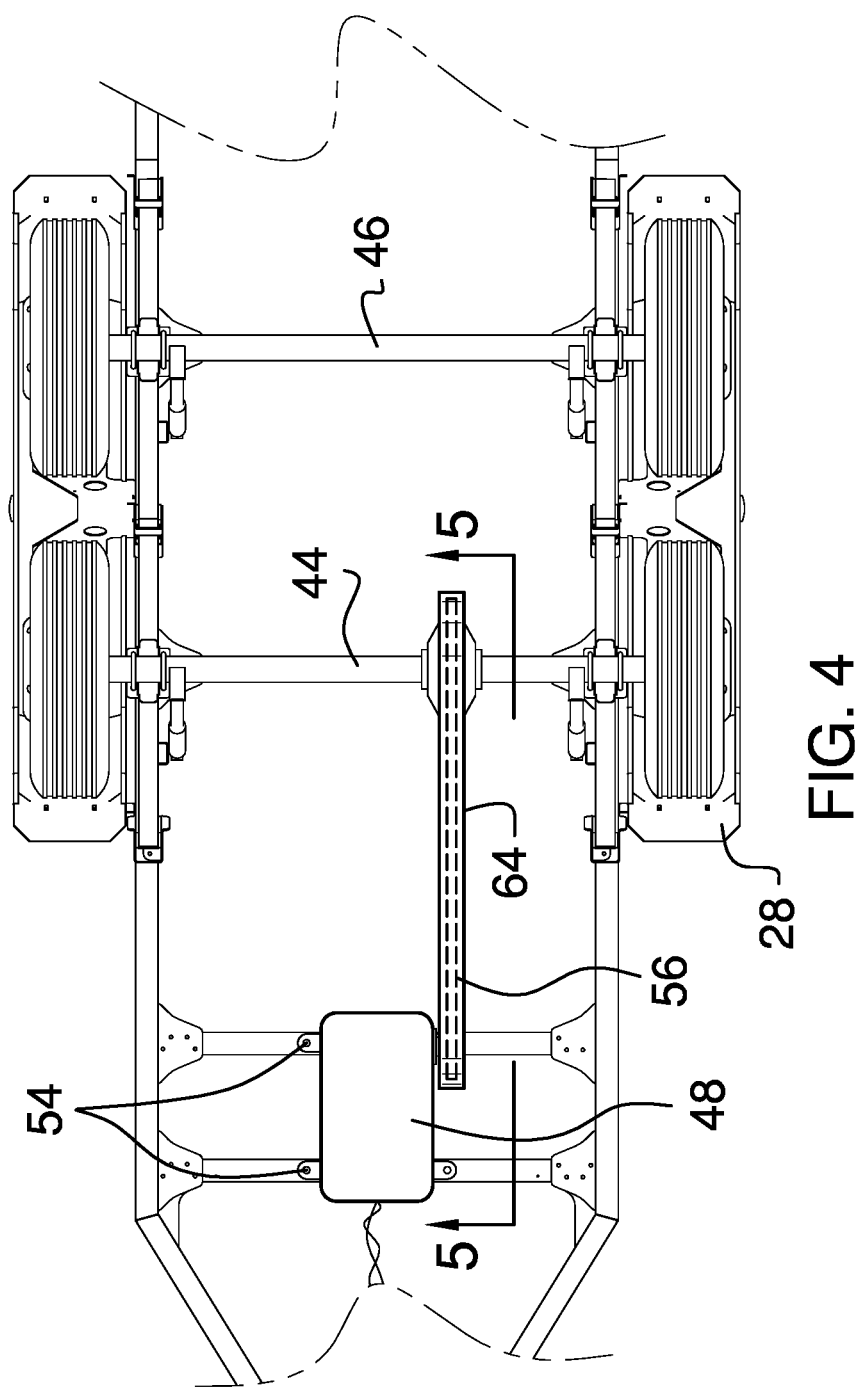
FIG. 4 is a bottom plan view of an embodiment of the disclosure.
Figure 5:
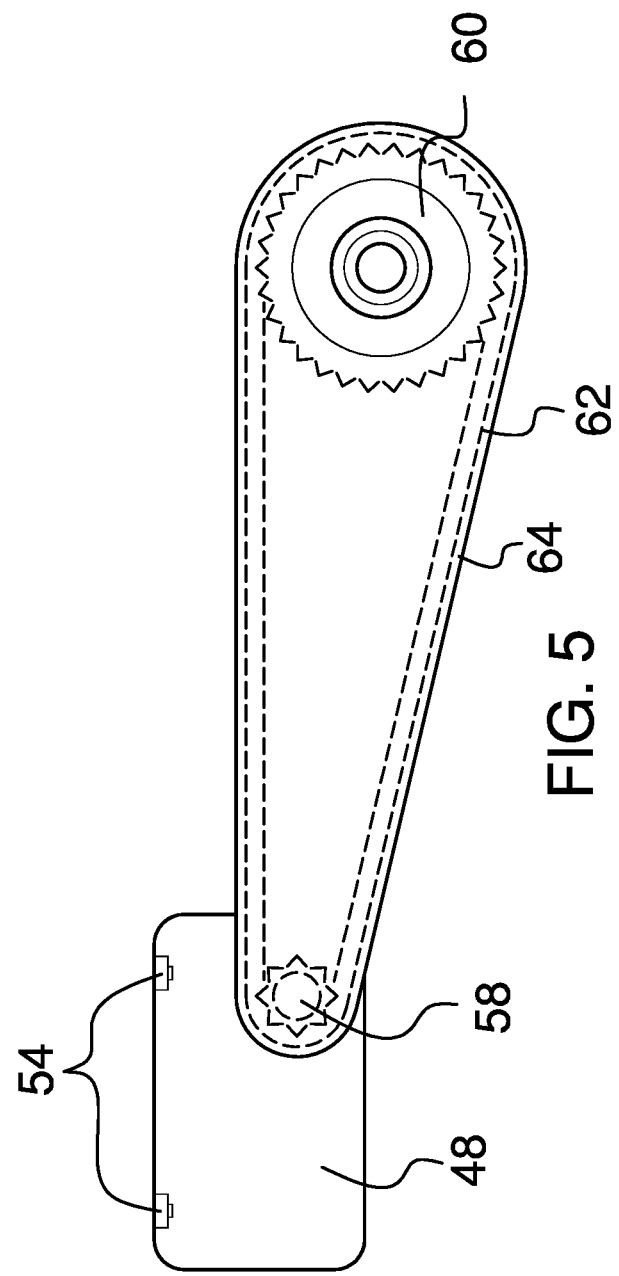
FIG. 5 is a detail view of an embodiment of the disclosure.

With reference now to the drawings, and in particular to FIGS. 1 through 5 thereof, a new trailer embodying the principles and concepts of an embodiment of the disclosure and generally designated by the reference numeral 10 will be described.

As best illustrated in FIGS. 1 through 5, the gearbox brake trailer apparatus 10 generally comprises a frame 12 having a front end 14, a left side 16, a right side 18, and a rear end 20. The front end 14 has a trailer hookup 22 configured to selectively engage a trailer hitch 24 of a truck 26. The front end 14 of the frame has a triangular portion 27 extending from the trailer hookup 22 to each of the left side 16 and the right side 18. The frame has at least one crossmember 28 perpendicularly extending between the left side 16 and the right side 18. A trailer deck 30 is coupled to the frame 12 and covers the left side 16, the right side 18, and the rear end 20 of the frame. The frame may have an angled reinforcement 31 coupled to the rear end 20 and extending from the left side 16 to the right side 18.

A plurality of wheel pairs 32 is coupled to the frame 12. Each of the wheel pairs 32 has an axle 34 rotatably coupled between the left side 16 and the right side 18 of the frame and a pair of tires 36 coupled to the axle 34. A plurality of wheel covers 38 is coupled to the left side 16 and the right side 18 of the frame. The plurality of wheel covers 38 comprises a pair of front double covers 40 and a pair of rear single covers 42. The front double covers 40 extend over the pairs of wheels 36 of a front most wheel pair 44 and the pair of tires 36 of a medial wheel pair 46 of the plurality of wheel pairs. Each wheel cover 38 may be faceted.

A gearbox 48 is coupled to the frame 12. The gearbox 48 has a wiring harness 50 configured to selectively engage with an electrical control plug 52 of the truck to allow the gearbox 48 to be controlled from a control unit 53 within the truck 26. A plurality of mounting flanges 54 is coupled to the gearbox 48. The mounting flanges 54 receive hardware to mount the gearbox 48 to the at least one crossmembers 28 of the frame.

A drive linkage 56 is coupled to the gearbox 48 and is in operational communication with the gearbox 48 and with the axle 34 of the front most wheel pair 44 of the plurality of wheel pairs to brake the rotation of the front most wheel pair 44 and slow the apparatus 10, particularly while going downhill. The drive linkage 56 may comprise a front sprocket 58 coupled to the gearbox 48, a rear sprocket 60 coupled to the axle 34 of the front most wheel pair 44, and a chain 62 coupled around the front sprocket 58 and the rear sprocket 60. A cover 64 may be coupled to the drive linkage 56 around the front sprocket 58, the rear sprocket, 60 and the chain 62 to prevent objects from interfering with the drive linkage 56. The drive linkage 56 may alternatively comprise a driveshaft 66 and a differential 68. The driveshaft 66 extends from the gearbox 48 and the differential 68 is coupled to the axle 34 of the front most wheel pair 44.

In use, the trailer hookup 22 of the frame is engaged with the trailer hitch 24 of the truck and is used as a traditional trailer. When braking, particularly down a steep grade, the gearbox 48 is controlled via the control unit 53 to shift into a lower gear to mechanically slow the axle 34 of the front most wheel pair 44 to safely brake the apparatus 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A gearbox brake trailer apparatus comprising:
   a frame, the frame having a front end, a left side, a right side, and a rear end, the front end having a trailer hookup configured to selectively engage a trailer hitch of a truck;
   a trailer deck coupled to the frame, the trailer deck covering the left side, the right side, and the rear end of the frame;
   a plurality of wheel pairs coupled to the frame, each of the wheel pairs having an axle rotatably coupled between the left side and the right side of the frame and a pair of tires coupled to the axle;
   a gearbox coupled to the frame, the gearbox having a wiring harness, the wiring harness being configured to selectively engage with an electrical control plug of the truck; and
   a drive linkage coupled to the gearbox, the drive linkage being in operational communication with the gearbox and with the axle of a front most wheel pair of the plurality of wheel pairs to brake the rotation of the front most wheel pair, the drive linkage comprising a front sprocket coupled to the gearbox, a rear sprocket coupled to the axle of the front most wheel pair, and a chain coupled around the front sprocket and the rear sprocket.

2. The gearbox brake trailer apparatus of claim 1 further comprising the drive linkage comprising a driveshaft and a differential, the driveshaft extending from the gearbox and the differential being coupled to the axle of the front most wheel pair.

3. The gearbox brake trailer apparatus of claim 1 further comprising a cover coupled around the front sprocket, the rear sprocket, and the chain.

4. The gearbox brake trailer apparatus of claim 1 further comprising a plurality of mounting flanges coupled to the gearbox, the mounting flanges receiving hardware to mount the gearbox to at least one crossmember of the frame, the crossmember perpendicularly extending between the left side and the right side.

5. The gearbox brake trailer apparatus of claim 1 further comprising the front end of the frame having a triangular portion extending from the trailer hookup to each of the left side and the right side.

6. The gearbox brake trailer apparatus of claim 1 further comprising a plurality of wheel covers coupled to the frame, the plurality of wheel covers being coupled to the left side and the right side.

7. The gearbox brake trailer apparatus of claim 6 further comprising the plurality of wheel covers comprising a pair of front double covers and a pair of rear single covers, the front double covers extending over the pairs of wheels of the front most wheel pair and the pair of tires of a medial wheel pair of the plurality of wheel pairs.

8. A gearbox brake trailer apparatus comprising:
   a frame, the frame having a front end, a left side, a right side, and a rear end, the front end having a trailer hookup configured to selectively engage a trailer hitch of a truck, the front end of the frame having a triangular portion extending from the trailer hookup to each of the left side and the right side;
   a trailer deck coupled to the frame, the trailer deck covering the left side, the right side, and the rear end of the frame;
   a plurality of wheel pairs coupled to the frame, each of the wheel pairs having an axle rotatably coupled between the left side and the right side of the frame and a pair of tires coupled to the axle;
   a plurality of wheel covers coupled to the frame, the plurality of wheel covers being coupled to the left side and the right side, the plurality of wheel covers comprising a pair of front double covers and a pair of rear single covers, the front double covers extending over the pairs of wheels of a front most wheel pair and the pair of tires of a medial wheel pair of the plurality of wheel pairs;
   a gearbox coupled to the frame, the gearbox having a wiring harness, the wiring harness being configured to selectively engage with an electrical control plug of the truck;
   a plurality of mounting flanges coupled to the gearbox, the mounting flanges receiving hardware to mount the gearbox to at least one crossmember of the frame, the crossmember perpendicularly extending between the left side and the right side; and
   a drive linkage coupled to the gearbox, the drive linkage being in operational communication with the gearbox and with the axle of the front most wheel pair of the plurality of wheel pairs to brake the rotation of the front most wheel pair, the drive linkage comprising a driveshaft and a differential, the driveshaft extending from the gearbox and the differential being coupled to the axle of the front most wheel pair.

9. A gearbox brake trailer apparatus comprising:

a frame, the frame having a front end, a left side, a right side, and a rear end, the front end having a trailer hookup configured to selectively engage a trailer hitch of a truck, the front end of the frame having a triangular portion extending from the trailer hookup to each of the left side and the right side;

a trailer deck coupled to the frame, the trailer deck covering the left side, the right side, and the rear end of the frame;

a plurality of wheel pairs coupled to the frame, each of the wheel pairs having an axle rotatably coupled between the left side and the right side of the frame and a pair of tires coupled to the axle;

a plurality of wheel covers coupled to the frame, the plurality of wheel covers being coupled to the left side and the right side, the plurality of wheel covers comprising a pair of front double covers and a pair of rear single covers, the front double covers extending over the pairs of wheels of a front most wheel pair and the pair of tires of a medial wheel pair of the plurality of wheel pairs;

a gearbox coupled to the frame, the gearbox having a wiring harness, the wiring harness being configured to selectively engage with an electrical control plug of the truck;

a plurality of mounting flanges coupled to the gearbox, the mounting flanges receiving hardware to mount the gearbox to at least one crossmember of the frame, the crossmember perpendicularly extending between the left side and the right side;

a drive linkage coupled to the gearbox, the drive linkage being in operational communication with the gearbox and with the axle of the front most wheel pair of the plurality of wheel pairs to brake the rotation of the front most wheel pair, the drive linkage comprising a front sprocket coupled to the gearbox, a rear sprocket coupled to the axle of the front most wheel pair, and a chain coupled around the front sprocket and the rear sprocket; and a cover coupled to the drive linkage, the cover being coupled around the front sprocket, the rear sprocket, and the chain.

* * * * *